United States Patent [19]

Gupta

[11] Patent Number: 4,894,488
[45] Date of Patent: Jan. 16, 1990

[54] HIGH FREQUENCY SIGNAL CABLE WITH IMPROVED ELECTRICAL DISSIPATION FACTOR AND METHOD OF PRODUCING SAME

[75] Inventor: Chakra V. Gupta, Conover, N.C.
[73] Assignee: Comm/Scope, Inc., Catawba, N.C.
[21] Appl. No.: 309,831
[22] Filed: Feb. 10, 1989

Related U.S. Application Data

[63] Continuation-in-part of Ser. No. 170,774, Mar. 21, 1988, abandoned.

[51] Int. Cl.$^4$ .................. H01B 11/18; H01B 13/14
[52] U.S. Cl. .................................. 174/28; 156/51; 174/110 FC; 174/110 F; 333/243
[58] Field of Search .............. 174/110 PM, 110 FC, 174/110 F, 28, 25 G; 156/51; 333/243

[56] References Cited

U.S. PATENT DOCUMENTS

| | | | |
|---|---|---|---|
| 2,948,020 | 8/1960 | D'Ascoli | 174/110 F |
| 3,582,533 | 6/1971 | Albright et al. | 174/37 |
| 3,684,816 | 8/1972 | Reighter | 174/110 F X |
| 3,968,463 | 7/1976 | Boysen | 174/110 F X |
| 4,104,481 | 8/1978 | Wilkenloh et al. | 174/28 |
| 4,107,354 | 8/1978 | Wilkenloh et al. | 427/118 |
| 4,248,275 | 2/1981 | Reed | 141/4 |
| 4,304,713 | 12/1981 | Perelman | 264/45.9 |
| 4,368,350 | 1/1983 | Perelman | 174/110 F X |
| 4,468,435 | 8/1984 | Shimba et al. | 174/110 F X |
| 4,560,829 | 12/1985 | Reed et al. | 174/110 F X |
| 4,663,095 | 5/1987 | Battais | 174/110 F X |

FOREIGN PATENT DOCUMENTS

| | | |
|---|---|---|
| 880377 | 9/1971 | Canada . |
| 48-98385 | 3/1972 | Japan . |
| 53-20665 | 6/1978 | Japan . |
| 55-19764 | 2/1980 | Japan . |
| 1476371 | 6/1977 | United Kingdom . |

*Primary Examiner*—Morris H. Nimmo
*Attorney, Agent, or Firm*—Bell, Seltzer, Park & Gibson

[57] ABSTRACT

A cable and method for making such cable is disclosed. The cable is especially suited for high frequency applications in which electrical attenuation and dissipation factor are of critical importance. The cable comprises a tubular outer conductor, and at least one inner conductor for transmission of electrical signals. Between the inner and outer conductor is a foamed dielectric material. This dielectric is formed from the extrusion of an olefin polymer or a fluoropolymer with a blowing agent gas. Sulfurhexafluoride ($SF_6$), rather than environmentally unsafe chlorofluorocarbons, is used as a blowing agent to foam the dielectric.

32 Claims, 1 Drawing Sheet

U.S. Patent  Jan. 16, 1990  4,894,488
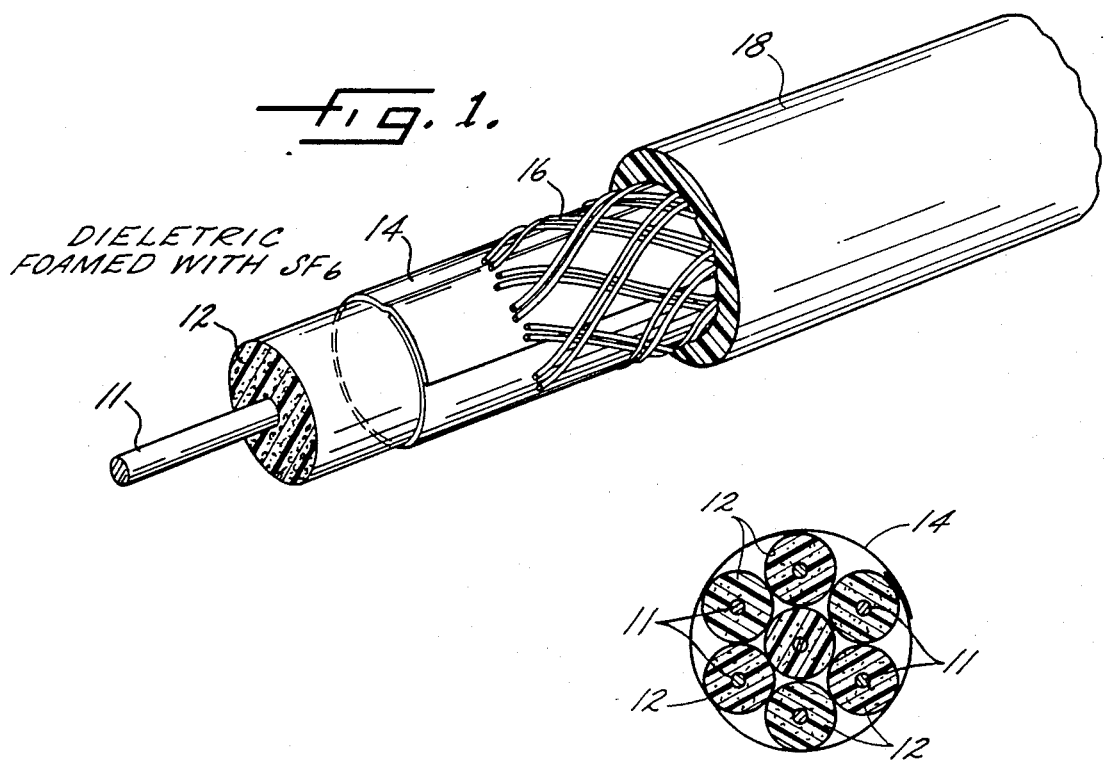
Fig. 1.
Fig. 2.
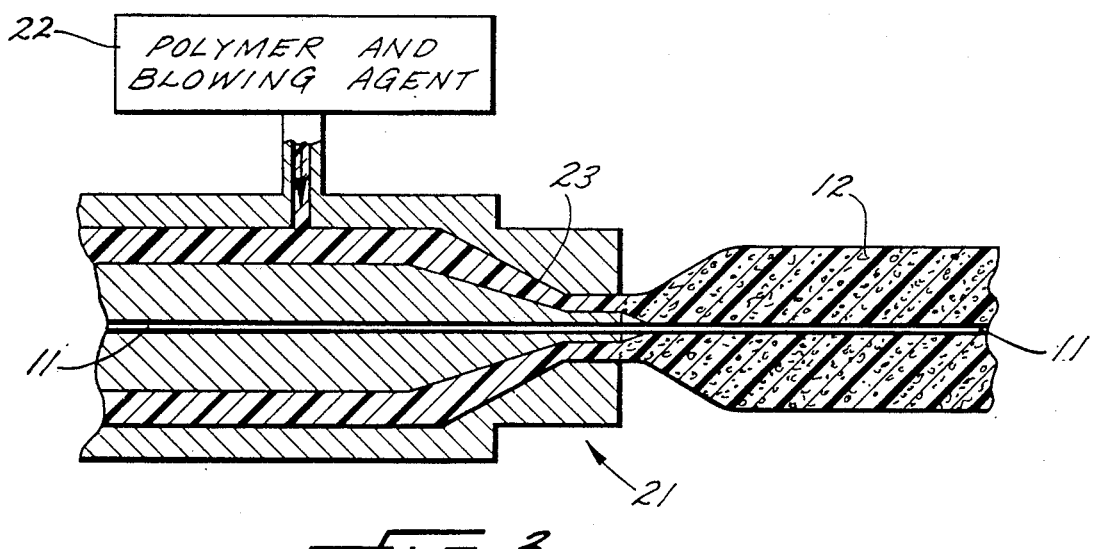
Fig. 3.

HIGH FREQUENCY SIGNAL CABLE WITH IMPROVED ELECTRICAL DISSIPATION FACTOR AND METHOD OF PRODUCING SAME

CROSS-REFERENCE TO RELATED APPLICATIONS

This application is a continuation-in-part of copending application Ser. No. 170,774 filed on Mar. 21, 1988, now abandoned.

BACKGROUND OF THE INVENTION

This invention relates to the production of cables, and more particularly is concerned with producing cables having greatly improved electrical properties in applications where high frequency (e.g. radio frequency and microwave) electrical signals are involved. In addition, this invention provides a method of producing such cables in an environmentally safe manner without using chlorofluorocarbons.

Cables of the type designed for carrying high frequency RF and microwave signals usually comprise a core having one or more inner conductors, surrounded by a dielectric, with an outer conductor or shield surrounding the dielectric. The inner conductor or conductors and the outer conductor are made of an appropriate conductive metal, e.g., copper, aluminum and various alloys, and the dielectric is usually composed of a foamed polymer such as polyethylene or a fluoropolymer.

The core of the cable is most commonly produced by extruding a mixture of the polymer and a volatile blowing agent around the inner conductor or conductors. The volatile blowing agent is injected into the extruder barrel and mixed with the polymer under the pressure of the extruder. Upon emerging from the extruder, the blowing agent forms a gas which controllably expands the polymer to create a polymer foam of a fine, uniform and closed cell structure. Chlorofluorocarbon compounds have been the most commonly used types of blowing agents for producing foam dielectrics from olefins and fluoropolymers, where the desired expansion ratio of the foam is greater than 2. U.S. Pat. Nos. 4,104,481 and 4,107,354 to Wilkenloh, et al., for example, disclose methods of forming cables with a foam polyethylene dielectric using chlorofluorocarbon (CFC) blowing agents such as CFC-12, CFC-114, CFC-113, CFC-11, and mixtures of these gases. CFC-22 ($CHClF_2$; chlorodifluoromethane) is another commonly used chlorofluorocarbon blowing agent.

Although the foamed polymer dielectric materials have acceptable insulating properties (i.e. a low dielectric constant), the inherent dissipation factor, tan $\delta$, of the dielectric material causes undesired attenuation of the electrical signal at the high RF and microwave operating frequencies of the cables. This power loss, which is sometimes referred to as "dielectric loss", contributes to the dissipation of the electrical signal. Efforts have been made to improve the signal dissipation of cables by improvements in the dielectric loss properties of the polymer from which the foam dielectric is produced, and a number of specialized polymers have been developed for this purpose. However, it has been discovered that the blowing agents used in producing the foam structure also contribute to the undesired dielectric loss. The blowing agent gas, which remains trapped in the cells of the polymer, has its own dissipation factor, tan $\delta$, which contributes to the dielectric loss of the foam dielectric. In addition, the blowing agent may thermally decompose under the extrusion conditions, and the decomposition products, or compounds or radicals formed from the interaction of the decomposition products and the foam dielectric, may also contribute to the undesired signal dissipation. Any one of these mechanisms has severe adverse effects on the signal dissipation properties of the foam dielectric. This problem is especially troublesome with fluoropolymers, such as fluorinated ethylene-propylene (FEP) polymers. Since these polymers are extruded at significantly higher temperatures than polyethylene (about 600° F. compared to about 300° F.), the higher temperature is more likely to degrade the blowing agent into electrically deleterious decomposition products.

With the foregoing in mind, it is an important object of the present invention to provide improvements in the electrical signal dissipation properties of high frequency cables. More particularly, an object of this invention is to provide improvements in the electrical signal dissipation properties of high frequency cables of the type having a dielectric material of a foamed polymer such as a polyolefin or fluoropolymer.

Environmental Impact

In recent years it has been recognized that chlorofluorocarbons endanger the stratospheric ozone layer above the earth. This layer functions to intercept harmful solar ultraviolet rays. With reduced stratospheric ozone levels, higher levels of ultraviolet light are transmitted, which leads to increased health risks, such as skin cancer and eye problems, among other dangers. The use of CFC's in aerosol spray cans was banned by the United States in 1978, but these chemicals continue to be widely used in other applications, such as in the manufacture of foams. "*The Search for Ozone-Friendly Refrigerants,*" *Discover: The World of Science,* July 1988 edition, p. 24.

The Environmental Protection Agency recently ordered a 50 percent cut in the production of chemicals blamed for eroding the earth's ozone layer. The EPA ordered a limitation on the amount of certain environmentally damaging CFC's manufactured or used to levels approximating 1986 amounts, followed by a 20 percent cut by mid-1993, and a 50 percent reduction by mid-1998. The EPA actions constitute a response to an international agreement signed by thirty-seven countries in September, 1987.

A number of alternative chlorofluorocarbons have been developed and proposed as substitutes for the environmentally damaging CFC's. Many of these alternative compounds have been found suitable for use in manufacturing applications where the restricted CFC's were formerly employed. However, the toxicological impact of these alternative CFC's in the various manufacturing applications has yet to be fully assessed. These alternative compounds typically rely on the inherent chemical instability of the compounds to render them environmentally safe, so that the compounds will decompose into harmless byproducts when they reach the ozone layer. However, this inherent chemical instability makes the compounds undesirable in producing foam cable dielectrics by melt extrusion, particularly at the elevated extrusion temperatures required by fluoropolymers, since as noted above, the decomposition of blowing agents has a serious adverse effect on the electrical signal dissipation properties of the dielectric.

The production of a foam polymer dielectric suitable for use in high frequency wire and cable applications presents a set of specific and demanding requirements which are not encountered in many of the other applications where conventional CFC's or the newly developed alternative CFC's are employed. The blowing agent gas must be nontoxic and noncorrosive, must possess appropriate thermodynamic properties to foam the polymer to a high expansion ratio (typically an expansion ratio of 2 or greater), must possess compatible solubility and diffusion in the particular polymer with which it is used, and it must possess good thermal stability at temperatures as high as 600° F.

Thus, another important object of the present invention is to provide for the production of high frequency cables of the type employing a foam polymer dielectric material while minimizing or eliminating the use of restricted, environmentally damaging chlorofluorocarbon blowing agents.

Still another object of the invention is to provide a foam cable dielectric material having excellent electrical signal dissipation properties at high frequencies, without the use of environmentally damaging chlorofluorocarbon blowing agents.

SUMMARY OF THE INVENTION

The present invention is based upon the use of sulfurhexafluoride ($SF_6$) as a blowing agent for the production of high frequency electrical cables. Sulfurhexafluoride gas exhibits unique properties which make it significantly better as a blowing agent gas for cable dielectrics than other gases which have been used in the past. In particular, the use of sulfurhexafluoride ($SF_6$) as a blowing agent results in an excellent high frequency cable with electrical signal dissipation properties superior to cables produced with chlorofluorocarbons. Sulfurhexafluoride has not, however, been found harmful to the ozone layer, and will qualify under current EPA guidelines for the use of environmentally safe blowing agents.

Sulfurhexafluoride has previously been used in electrical power cables for its high dielectric strength properties. For example, U.S. Patent No. 3,582,533 discloses a high voltage electrical power cable for underground applications in which corona discharge and high voltage arcing between the conductors and the soil are avoided by surrounding the conductors with a foam having sulfurhexafluoride gas entrapped in the cells thereof. Japanese patent publications 48-98385 and 53-20665 also disclose power cables in which sulfurhexafluoride is used for its advantageous high dielectric strength properties. In these references, an unfoamed layer of polyethylene is impregnated with $SF_6$ gas and forms an insulating layer around a power cable conductor.

Japanese patent publication 55-19764 discloses a method of making a cable wherein a foamed crosslinked olefin resin insulation layer is produced using a fluorinated hydrocarbon or sulfurhexafluoride blowing agent. An outer covering of an unfoamed resin whose permeation coefficient for sulfurhexafluoride is small surrounds the foam layer to retard the $SF_6$ from being replaced with air over the course of time. This reference takes advantage of the high dielectric strength of $SF_6$ in high voltage conditions (e.g. 15-35 KV at 4 KHz). However, it makes no mention of use of the cable at RF or microwave frequencies nor is it concerned with the dissipation factor of the dielectric. The is a power cable and not a signal cable. Signal cables are fundamentally different from power cables both in their intended use and in their design considerations and electrical properties. Thus, the surprising and unexpectedly superior quality of sulfurhexafluoride as a blowing agent for the dielectric in high frequency signal cables has not been previously recognized, nor has the prior art taught that a significantly reduced dissipation loss can be achieved in high frequency signal cables by producing the foam dielectric with a sulfurhexafluoride blowing agent.

The cables of the type to which the present invention pertains are used for transmitting high frequency (i.e. RF and microwave) signals. Examples include computer cables, community antenna & television (CATV) cables, and local area network (LAN) cables. The cables comprise at least one inner signal conductor, an outer conductor surrounding the inner signal conductor, and a foam dielectric disposed between the inner signal conductor and the outer conductor and serving to insulate the conductors from one another. The cables may be of the coaxial type or in the form of multiconductor cables and twisted pair cables.

The foam dielectric has a relatively high expansion ratio of 2 or greater and is produced using sulfurhexafluoride gas blowing agent. It comprises a polymer matrix having a multiplicity of cells formed therein, with the cells containing residual blowing agent comprising sulfurhexafluoride.

The cables are produced by extruding a mixture of a molten polymer and a blowing agent comprising sulfurhexafluoride around at least one inner conductor, expanding the mixture to form a foam, and applying an outer conductor around the expanded foam dielectric. The polymer may suitably comprise a polyolefin polymer such as polyethylene or fluoropolymers such as fluorinated ethylene-propylene (FEP) or perfluoro alkoxy (PFA) polymers.

BRIEF DESCRIPTION OF THE DRAWINGS

Some of the features and advantages of the invention have been described, others will become apparent from the detail description which follows and from the accompanying drawings in which FIG. 1 is a fragmentary perspective view of a coaxial cable in accordance with the present invention;

FIG. 2 is a fragmentary perspective view of a multiconductor cable in accordance with the present invention; and FIG. 3 is a cross-sectional view of an apparatus for producing cable of the present invention.

DESCRIPTION OF THE ILLUSTRATED EMBODIMENT

While the present invention will be described hereinafter with particular reference to the accompanying drawings, it is to be understood at the outset that it is contemplated that the present invention may be varied in specific detail from that illustrated and described herein while still achieving the desirable characteristics and features of the present invention. Accordingly, the description which follows is intended to be understood as a broad enabling disclosure directed to persons skilled in the applicable arts, and is not to be understood as being restrictive.

Referring now more particularly to the drawings, the particular cable illustrated in FIG. 1 is a coaxial cable which includes a core formed of an inner conductor 11 surrounded by a foamed polymer dielectric 12. The core is surrounded by an outer conductor formed of an aluminum foil layer 14, with a metal braid 16 covering the circumference of the foil layer. A durable jacketing layer 18, formed of a suitable jacketing material such as polyvinyl chloride, PVDF or FEP, provides a protective, flexible outer covering for the finished cable product. Although the illustrated embodiment shows a coaxial cable with only a single inner conductor 11, the present invention is applicable to high frequency cables of other known constructions employing one or more inner conductors, such as for example, cables employing a pair of side-by-side inner conductors (sometimes referred to as a twinaxial cable), or shielded cables employing a multiplicity of inner conductors, e.g. twisted pairs. Similarly, the outer conductor may be of other known constructions used in high frequency cables, such as braided metal wire or a seamless, swaged aluminum tube for example. Thus for example, FIG. 2 illustrates a multiconductor cable having a large number of inner conductors 11', surrounded by a foam polymer dielectric 12 in accordance with the invention, and with an outer shielding conductor 14 surrounding the dielectric 12 and the inner conductors 11'. The inner conductor or conductors 11 or 11' and the outer conductor 14 be formed of any suitable electrically conductive metal or alloy, such as copper, aluminum, or copper-clad aluminum for example.

The dielectric 12 is formed of a thermoplastic foamable polymer. Particularly suitable are polyolefins such as low and high density polyethylene and polypropylene. The unexpanded, polyolefin typically has a density in the range of from 0.91 to about 0.97 g/cc. In the expanded form, it preferably has a density of 0.5 g/cc or less, and most desirably about 0.25 g/cc or less. The dielectric may also contain finely divided particulate nucleants as is conventional in the art. For example, the nucleants may include calcium carbonate, silica products, silicates, or thermally decomposable compounds such as azodicarbonamide. A particularly suitable polyethylene polymer has a density of 0.95 g/cc and a melt index in the range of about 7 to 12 decigrams/minute.

The dielectric 12 may also be formed from a foamed fluoropolymer. The fluoropolymer is preferably a fluorinated ethylene-propylene (FEP) polymer or a perfluoro alkoxy copolymer (PFA). Fluoropolymers of this type are advantageously used to produce a cable having resistance to high temperatures and/or fires. Thus for example, cables having a high fire resistance rating and designed for installation in the plenum area above suspended ceilings in offices (commonly referred to as "plenum cables") are formed with a foamed fluoropolymer dielectric material. A preferred fluorinated ethylene-propylene polymer has a density of 1.9 to 2.2 grams per cubic centimeter and a melt flow number of 6.5 (inherent viscosity $=8\times 10$ poise) at 700° F. In expanded form, the fluoropolymer foam preferably has a density of 1.1 g/cc or less.

FIG. 3 schematically illustrates an extruder apparatus of the type used for making the cable of the present invention. The apparatus includes an extrusion cross head, generally indicated at 21 having a central opening or bore through which the center conductor 11 is advanced. The polymer material, typically in granular or pellet form, is introduced into a extruder apparatus indicated schematically at 22, and melted. A blowing agent containing sulfurhexafluoride is injected under pressure into the extruder 22 and is thoroughly mixed with the molten polymer. The molten polymer and blowing agent mixture is directed into the extrusion head 21 and is directed through a channel 23 into surrounding relation with the center conductor 11. As the mixture exits the die around the center conductor 11, the blowing agent becomes exposed to atmospheric pressure causing the molten polymer to expand by the formation of small cells or bubbles of $SF_6$ in a matrix of solidifying foamed polymer. The expansion of the foamed polymer reduces its density to a fraction of that of the unfoamed polymer.

To provide the low signal dissipation properties required in a signal cable, the expansion ratio of the foamed polymer dielectric should preferably be 2 or greater and most desirably 2.3 or greater. For polyolefin polymers, the expansion ratio is most desirably 3 or greater. The "expansion ratio" is defined as the ratio of the specific volume (volume per unit weight) of the foam to the specific volume of the unexpanded polymer. The specific volume of the foam and of the polymer may be determined by conventional liquid displacement tests. Thus for example, a foamed polyethylene dielectric having a density of 0.25 g/cc and formed from polyethylene whose unfoamed density is 0.97 g/cc would have an expansion ratio of 3.88. Similarly, a foamed FEP dielectric having a foamed density of 0.9 g/cc and an unfoamed density of 2.1 g/cc would have an expansion ratio of 2.33.

The blowing agent may be composed solely of sulfurhexafluoride or the sulfurhexafluoride may be mixed with other volatile blowing agents, such as CFC-22, CFC-134, CFC-116, $N_2$ or $CO_2$. When sulfurhexafluoride is mixed with other blowing agents, it preferably comprises at least 50 percent of the mixture.

EXAMPLE

This example illustrates how cables in accordance with the present invention are made, and also demonstrates the reduction in dielectric loss achieved by the use of the sulfurhexafluoride blowing agent. In this example, three different type of cables were produced, a one-half inch diameter coaxial cable with a polyethylene foam dielectric, a one half-inch diameter coaxial cable with a fluorinated ethylene-propylene (FEP) polymer foam dielectric material, and a three-fourths inch diameter coaxial cable with a polyethylene foam dielectric. Each cable had a copper center conductor, a core formed of a foam polymer dielectric material, and an outer conductor surrounding the core formed of a swaged aluminum tube. For each cable type, two cable samples of substantially identical construction were made using the same manufacturing procedures, except for the gaseous blowing agent used for forming the foam dielectric. In one cable sample, sulfurhexafluoride was used as the blowing agent to foam the FEP pursuant to the invention, while in the other cable (the control) a mixture of chlorofluorocarbon blowing agents was used pursuant to prior art practices. The electrical attenuation of each cable was measured at various frequencies. In order to determine the improvement in dielectric loss which is attributable to the foam dielectric, the metallic loss (i.e the attenuation of the metallic core and sheath components) was calculated. The difference between the total cable attenuation and the metallic loss is the dielectric loss. The results are shown in Table 1:

TABLE 1

| | \multicolumn{5}{c}{Attenuation —(dB/100 ft.) at Frequency (Mhz)} | | | | |
|---|---|---|---|---|---|
| | 50 | 300 | 450 | 1000 | 2000 |
| ½ inch Polyethylene foam dielectric | | | | | |
| Total attenuation with SF$_6$ blowing agt. | 0.34 | 0.88 | 1.09 | 1.69 | 2.39 |
| Total attenuation with CFC 11/12 blowing agt. | 0.35 | 0.89 | 1.11 | 1.77 | 2.64 |
| Metallic loss | 0.318 | 0.779 | 0.954 | 1.423 | 2.012 |
| Dielectric loss with SF$_6$ | 0.031 | 0.110 | 0.154 | 0.345 | 0.378 |
| Dielectric loss with CFC 11/12 | 0.032 | 0.111 | 0.156 | 0.347 | 0.628 |
| Dielectric loss reduction with SF$_6$ | 0.01 | 0.01 | 0.02 | 0.08 | 0.250 |
| Percent reduction in dielectric loss | 31.25 | 9.01 | 12.8 | 23.05 | 39.8 |
| ½ inch FEP foam dielectric | | | | | |
| Total attenuation with SF$_6$ blowing agt. | 0.56 | 1.60 | 2.10 | 3.69 | 6.07 |
| Total attenuation with CFC 12/22 blowing agt. | 0.57 | 1.66 | 2.18 | 3.87 | 6.39 |
| Metallic loss | 0.49 | 1.20 | 1.47 | 2.19 | 3.10 |
| Dielectric loss with SF$_6$ | 0.07 | 0.40 | 0.63 | 1.50 | 2.97 |
| Dielectric loss with CFC 12/22 | 0.08 | 0.46 | 0.71 | 1.68 | 3.29 |
| Dielectric loss reduction with SF$_6$ | 0.01 | 0.06 | 0.08 | 0.18 | 0.32 |
| Percent reduction in dielectric loss | 12.5 | 13.0 | 11.3 | 10.7 | 10.7 |
| ¼ inch Polyethylene foam dielectric | | | | | |
| Total attenuation with SF$_6$ blowing agt. | 0.52 | 1.28 | 1.59 | | |
| Total attenuation with CFC 11/12 blowing agt. | 0.52 | 1.31 | 1.63 | | |
| Dielectric loss reduction with SF$_6$ | — | 0.03 | 0.04 | | |
| Percent reduction in dielectric loss | — | 23.5 | 22.6 | | |

That which I claim:

1. A high frequency signal cable having improved electrical attenuation properties, comprising at least one inner signal conductor, an outer shielding conductor surrounding said at least one inner signal conductor, and a foam dielectric disposed between said inner signal conductor and said outer shielding conductor, said foam dielectric comprising a polymer matrix having a multiplicity of cells formed therein, said cells containing residual blowing agent comprising sulfurhexafluoride.

2. A cable according to claim 1 wherein the foam dielectric has an expansion ratio of 2 or greater.

3. A cable according to claim 1 wherein said blowing agent comprises sulfurhexafluoride and at least one other gas.

4. A cable according to claim 1 wherein said cells additionally comprise the residue of a thermally decomposable chemical blowing agent.

5. A cable according to claim 1 wherein said polymer comprises a polyolefin polymer.

6. A cable according to claim 5 wherein the polyolefin polymer comprises polyethylene having a density of 0.91 to 0.97 grams per cubic centimeter, and the foamed polymer has a density of 0.5 grams per cubic centimeter or less.

7. A cable according to claim 1 wherein said polymer comprises a fluoropolymer.

8. A cable according to claim 7 wherein the fluoropolymer comprises fluorinated ethylene-propylene polymer.

9. A cable according to claim 8 wherein the fluorinated ethylene-propylene polymer has a density of 1.9 to 2.2 grams per cubic centimeter, and the foamed polymer has a density of 1.1 grams per cubic centimeter or less.

10. A cable according to claim 7 wherein the fluoropolymer comprises perfluoro alkoxy copolymer.

11. A cable as defined in claim 1 which comprises a single inner signal conductor surrounded by said outer shielding conductor, and wherein the inner conductor is disposed coaxially with said outer conductor.

12. A cable as defined in claim 1 which comprises a plurality of inner signal conductors surrounded by said outer shielding conductor.

13. A high frequency signal cable having improved electrical attenuation properties, comprising at least one inner conductor, a tubular outer conductor surrounding said at least one inner conductor, and a foam dielectric disposed between said at least one inner conductor and said outer conductor, said foam dielectric having an expansion ratio of 2 or greater and comprising a polyethylene polymer matrix having a multiplicity of closed cells formed therein, said cells containing sulfurhexafluoride blowing agent.

14. A high frequency signal cable having improved electrical attenuation properties, comprising at least one inner conductor, a tubular outer conductor surrounding said at least one inner conductor, and a foam dielectric disposed between said at least one inner conductor and said outer conductor, said foam dielectric having an expansion ratio of 2 or greater and comprising a fluorinated ethylene-propylene polymer matrix having a multiplicity of closed cells formed therein, said cells containing sulfurhexafluoride blowing agent.

15. A cable dielectric for high frequency signal cables comprising a foamed polymer having an expansion ratio of 2 or greater and comprising a foamed fluorinated ethylene-propylene polymer matrix having a multiplicity of closed cells formed therein, and sulfurhexafluoride blowing agent contained within said cells.

16. A cable dielectric according to claim 15 wherein said foamed polymer has an expansion ratio of 2.3 or greater.

17. A method of producing a high frequency signal cable with improved electrical attenuation properties at high frequencies which comprises extruding a mixture of a molten polymer and a blowing agent comprising sulfurhexafluoride around at least one inner signal conductor, expanding the mixture to form a foam dielectric, and applying an outer shielding conductor around the expanded foam dielectric.

18. The method according to claim 17 wherein the blowing agent comprises a mixture of sulfurhexafluoride and at least one other gas.

19. The method according to claim 17 wherein the blowing agent comprises a mixture of sulfurhexafluoride and a thermally decomposable chemical blowing agent.

20. The method according to claim 17 wherein the polymer comprises a polyolefin polymer.

21. The method according to claim 20 wherein the polyolefin polymer is polyethylene.

22. The method according to claim 17 wherein the polymer comprises a fluoropolymer.

23. The method according to claim 22 wherein the fluoropolymer comprises fluorinated ethylene-propylene polymer.

24. The method according to claim 22 wherein the fluoropolymer comprises perfluoro alkoxy copolymer.

25. The method according to claim 17 wherein the step of expanding the mixture comprises expanding the mixture to an expansion ratio of 2 or greater.

26. A method of providing improved electrical attenuation properties in a signal cable, which comprises: providing a cable having at least one inner signal conductor, an outer shielding conductor surrounding the inner signal conductor, and a foam dielectric disposed between the inner signal conductor and the outer shielding conductor comprised of a polymer matrix having a multiplicity of cells formed therein by a blowing agent containing sulfurhexafluoride, and transmitting high frequency RF or microwave signals through said signal cable.

27. The method according to claim 26 wherein the blowing agent comprises a mixture of sulfurhexafluoride and at least one other gas.

28. The method according to claim 26 wherein the polymer comprises a polyolefin polymer.

29. The method according to claim 28 wherein the polyolefin polymer is polyethylene.

30. The method according to claim 26 wherein the polymer comprises a fluoropolymer.

31. The method according to claim 30 wherein the fluoropolymer comprises fluorinated ethylene-propylene polymer.

32. A high frequency signal cable having improved electrical attenuation properties, comprising at least one inner signal conductor, an outer shielding conductor surrounding said at least one signal conductor, and a foam dielectric disposed between said signal conductor and said shielding conductor, said foam dielectric comprising a polymer matrix having a multiplicity of cells formed therein by a blowing agent containing sulfurhexafluoride.

* * * * *

UNITED STATES PATENT AND TRADEMARK OFFICE
CERTIFICATE OF CORRECTION

PATENT NO. : 4,894,488

DATED : January 16, 1990

INVENTOR(S) : Chakra V. Gupta

It is certified that error appears in the above-identified patent and that said Letters Patent is hereby corrected as shown below:

Column 5, line 56, "8 x 10" should be -- $8 \times 10^4$ --

Signed and Sealed this

Fourth Day of December, 1990

Attest:

HARRY F. MANBECK, JR.

*Attesting Officer*   *Commissioner of Patents and Trademarks*